Figure 1:
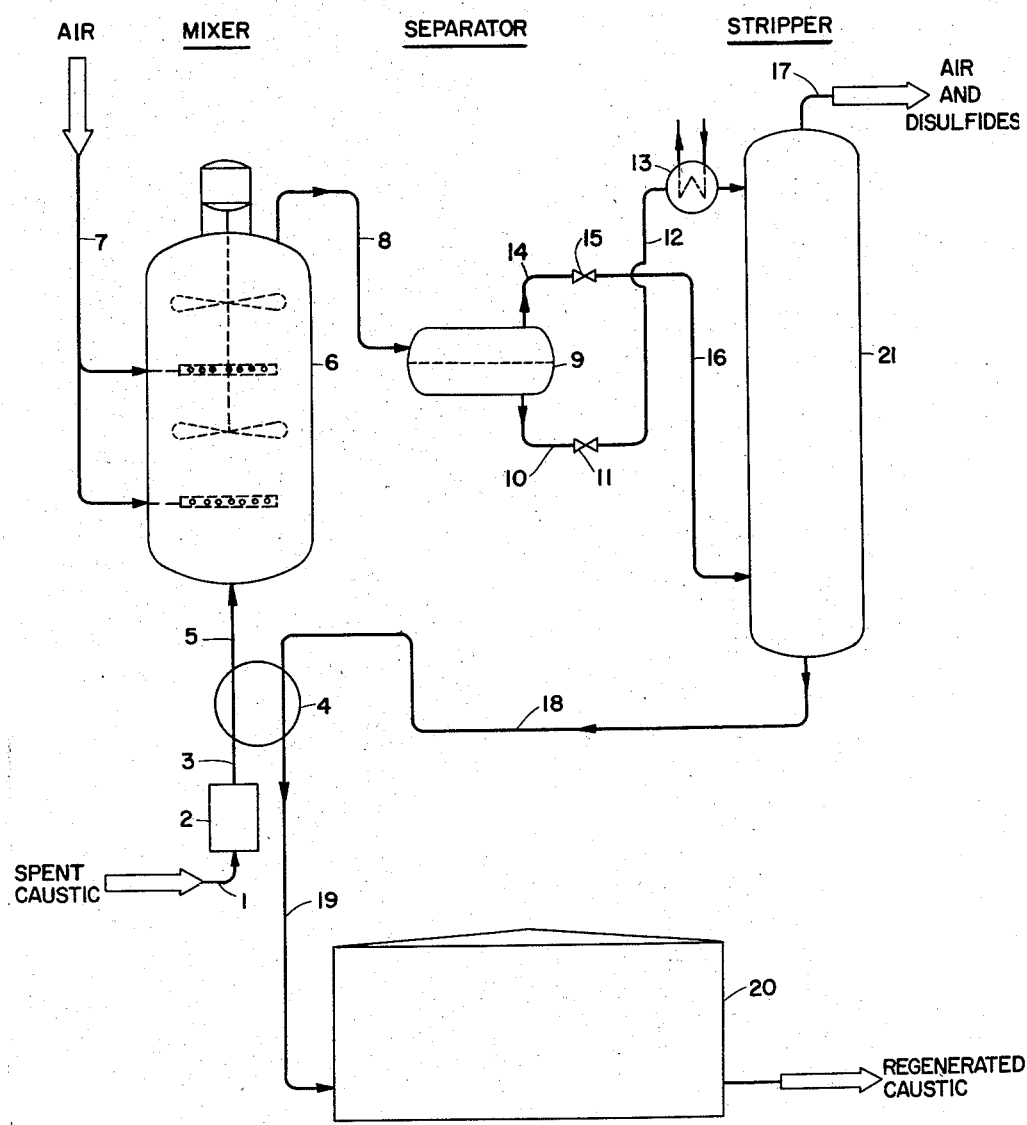

INVENTORS:
WILLEM EDUARD NIEUWENHUIS
JOHANN HEINRICH FRIEDRICH DIEDERICK SCHMIDT
BY: *Robert C. Clement*
THEIR ATTORNEY INVENTORS:
WILLEM EDUARD NIEUWENHUIS
JOHANN HEINRICH FRIEDRICH DIEDERICK SCHMIDT
BY: Robert C. Clement
THEIR ATTORNEY

2,882,132

REGENERATION OF CAUSTIC SOLUTIONS

Willem Eduard Nieuwenhuis, The Hague, and Johann Heinrich Friedrich Diederich Schmidt, Amsterdam, Netherlands, assignors to Shell Development Company, New York, N.Y., a corporation of Delaware Application November 26, 1956, Serial No. 624,405

Claims priority, application Netherlands November 29, 1955

3 Claims. (Cl. 23—184)

This invention relates to the regeneration of aqueous alkaline solutions containing mercaptides, especially such solutions which have been used for the removal of mercaptans from hydrocarbons.

Aqueous alkaline solutions, especially solutions of an alkali metal hydroxide, such as sodium hydroxide, are frequently used to extract mercaptans from liquid and gaseous mercaptan-containing petroleum or coal-tar fractions, such as natural gases, refinery gases, gasoline, kerosene and the like. Such treating solutions often also contain a solutizer for mercaptans. The mercaptans so extracted remain in the solutions in the form of mercaptides, for example sodium mercaptide in the case of sodium hydroxide solutions, and as the mercaptide concentration of a given treating solution increases it becomes less suitable for extracting mercaptans from a given material being treated. At some point it is therefore necessary to regenerate the solution by removing mercaptides. This removal can be effected in various ways; one of the most usual methods consists in heating the mercaptide-containing alkali metal hydroxide solution to an elevated temperature, e.g. the boiling temperature, mercaptans formed by hydrolysis of the mercaptides being expelled by an inert gas such as steam or nitrogen.

Another method of regeneration is that in which the mercaptide-containing alkali metal hydroxide solution is contacted with an oxygen-containing gas, such as air, at ordinary or slightly elevated temperature. The mercaptides are thereby oxidized to organic disulfides which are poorly soluble in the alkali metal hydroxide solution and, after cooling of the solution, can be separated by decanting, steaming, air blowing, or extracted from the solution with a liquid hydrocarbon as extractive solvent. The oxidation can be carried out both with oxygen under pressure and without catalyst or with an oxygen-containing gas in the presence of an oxidation catalyst, e.g. polyhydroxy-aromatic compounds.

In practice, however, it is found that the regeneration does not always proceed satisfactorily, either because the mercaptides cannot be completely removed from the alkali metal hydroxide solution to be regenerated as otherwise the oxiration catalyst is decomposed, with the result that it is no longer posisble to extract all the mercaptans from the hydrocarbon mixtures treated with such an incompletely regenerated solution, or because the extraction of the disulfides by means of lower hydrocarbons causes difficulties by the presence of solutizers or catalysts for the oxidation of the mercaptides to disulfides.

In order to avoid these difficulties more complicated techniques have been proposed, such as that in which with the incompletely regenerated alkali metal hydroxide solution the mercaptans still present in the hydrocarbon mixtures are converted to disulfides by means of an aftertreatment with air, the disulfides remaining in the hydrocarbon oil. The disadvantage of this is that although the hydrocarbon mixtures are thereby freed from mercaptans they are not freed from sulfur.

Other proposed techniques are that in which part of the hydrocarbon mixture already completely freed from mercaptans is sacrificed in order to regenerate completely at least a part of the alkali metal hydroxide solution, which part is then used in the last stage of a multi-stage removal of mercaptans from hydrocarbon mixtures; and that in which use is made of the fact that the lower disulfides have approximately the same volatility as the higher mercaptans. According to the latter process, the hydrocarbon mixture to be treated is split into a low-boiling and a high-boiling fraction. The low-boiling fraction is treated with a quantity of an alkali metal hydroxide solution and the lower mercaptides are converted with air into disulfides. The high-boiling fraction is treated with another amount of the alkali metal hydroxide solution in which higher mercaptans are taken up. The two alkali metal hydroxide solutions in which lower disulfides are dispersed, and higher mercaptans dissolved in the form of mercaptides, respectively, are combined. The lower disulfides and higher mercaptides are stripped by means of steam from the mixture thus formed.

Figure 2:
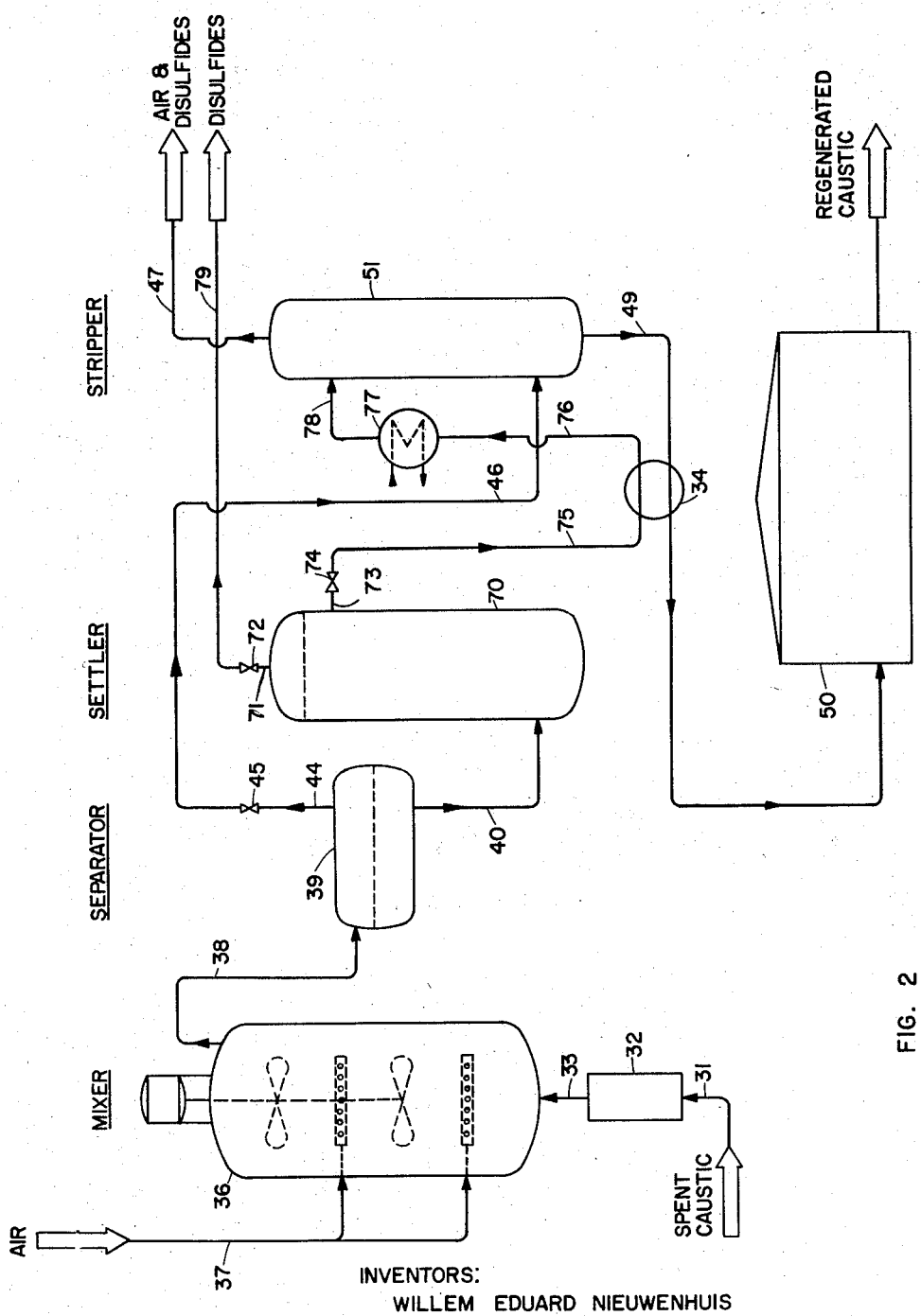

It is accordingly a principal object of the present invention to provide an improved process for the regeneration of aqueous alkaline solutions containing mercaptides. A more particular object is to provide a simple and economical process for the removal of mercaptides from aqueous alkaline solutions, especially aqueous alkali metal hydroxide solutions. Still another object of the invention is to provide an improved process for the regeneration of such solutions by the oxidation of the mercaptides therein to disulfides. These objects will be more fully understood and others will become apparent from the description of the invention, which will be made with reference to the accompanying drawing, wherein:

Figure 1 is a simplified flow diagram of a preferred process for carrying out the invention; and Figure 2 is a simplified flow diagram of a modification of the process of Figure 1.

It has now been found that a substantially complete regeneration of alkali metal hydroxide solutions, which may contain solutizers or oxidation catalysts, can be effected in a simple and reliable manner, and that disulfides formed by oxidation of mercaptides therein can be removed without extraction from the alkali metal hydroxide treating solution to be regenerated by a process comprising intimately contacting the mercaptide-containing treating solution with an excess of a free oxygen-containing gas at superatmospheric pressure, separating the solution from the excess gas and after particular adjustments of temperatures and pressures, using the excess gas for stripping disulfides from the treating solution.

Described in more detail, it has been found that unexpected advantages result from the regeneration of mercaptide-containing alkali metal hydroxide solutions (particularly those wherein the mercaptides are derived from lower mercaptans containing from 1 through 4 carbon atoms such as are present in gaseous hydrocarbon fractions, liquid butane-butylene mixtures and low-boiling gasoline fractions) by intimately mixing this solution in a mixing zone, which may comprise a mixing valve, turbomixer, propeller mixer, rotating disk contactor, or the like, with an excess of a free oxygen-containing gas such as air, under an elevated pressure sufficient to dissolve some and disperse the remainder of the gas in the treating solution, separating the solution from the excess gas, i.e., the part of the oxygen-containing gas which is not chemically consumed or disoslved in the solution at the mixing pressure, heating the solution and again contacting the heated solution with the excess gas in a separate stripping zone at a pressure substantially lower than the pressure of the mixing zone.

Air, oxygen, a mixture of oxygen and air, or a mixture of oxygen with an inert gas may be used as the free oxygen-containing gas. Air is preferred for reasons of availability and also because the ratio of oxygen to inert gas (i.e., nitrogen) therein is especially advantageous for the purposes of the present invention.

In order to ensure that the oxidation of the mercaptides dissolved in the alkali metal hydroxide solution proceeds smoothly, it is necessary for the concentration of the oxygen dissolved in the solution to be sufficiently high. This concentration depends, among other things, on whether air, oxygen, a mixture of air and oxygen, or a mixture of oxygen with an inert gas is used. The pressure and temperature also have a great effect. It is preferred to operate with the highest possible pressure, as in this case sufficient oxygen is dissolved in the solution to be regenerated. For technical reasons the total pressure chosen is preferably at least 2.5 atmospheres absolute, and most especially, in the case of air, approximately 6 atm. abs., which pressure can be reached by means of a single-stage compressor. Higher pressures, although advisable, increase costs disproportionately, as it is then necessary to use a compressor which operates in two or more stages. Generally speaking, the partial pressure of oxygen in the oxygen-containing gas should be at least about 0.5 atm. abs. and need not be greater than 1.2 atm. abs. However, good results are obtained under many conditions when the partial pressure of the oxygen in the oxygen-containing gas is as low as 0.3 atm. abs. or as high as 3 atm. abs., or even 20 atm. abs.

An excess of oxygen-containing gas must be used in order to obtain the advantages of the invention. At least 100% excess, and preferably at least 300% excess, oxygen, based on the stoichiometric amount required to convert all of the mercaptides into disulfides, should be used. Additionally, the total volume of oxygen-containing gas measured at standard conditions should be at least 5 times and preferably at least 20 times the volume, at standard conditions, of the stoichiometric requirement of oxygen. Generally, a total volume of oxygen-containing gas no more than 100, or most often no more than 50, times the volume of the stoichiometric oxygen is necessary or desirable.

A high temperature has a favorable effect on the reaction rate, but causes the solubility of the oxygen-containing gas in the caustic alkali solution to decrease considerably at any given pressure, so that the advantage of the higher reaction rate is somewhat nullified. With too high a temperature, e.g. higher than 80° C., during the oxidation of mercaptides to disulfides, side reactions also occur to form, for example, sulfonates, which owing to their emulsifying properties have an adverse effect on the separation of the various phases and lead to incomplete regeneration of the caustic alkali solution. It has been found by experiment that with the use of air as oxygen-containing gas with a pressure of approximately 6 atm. abs. and a temperature of approximately 70° C. the cost of the mixing device, for example as determined by the volume of a mixing vessel such as a turbo-mixer, can be at a minimum. In order to suppress substantially the above-mentioned side reactions, the conversion of mercaptides to disulfides can, if desired, be carried out in the mixing zone at temperatures below 70° C., for example such at 20° C. to 40° C.

When the excess oxygen-containing gas and the treating solution are separated, part of the disulfides formed are entrained in this gas stream. However, in accordance with the invention, the pressure of this gas stream is reduced after it leaves the separation zone, for example through a pressure-reducing valve. The gas, after being thus expanded, is no longer saturated with disulfides and is therefore capable of taking up further substantial amounts of disulfides. According to the process of the invention, this expanded gas stream is then used for stripping the remaining disulfides from the treating solution in a separate stripping zone.

The treating solution, after being separated from the excess oxygen-containing gas in the separation zone, contains in a dissolved or dispersed state the rest of the disulfides formed. This mixture can then be immediately heated and introduced, after reduction of pressure, directly into the stripping zone. If desired, however, part of the disulfides can first be separated from this stream by a gravitation method, for example in a settling zone or by means of a centrifuge or cyclone, and only then heated and introduced into the stripping zone. In general, it is more desirable to do this when a relatively low temperature is used in the mixing zone since under these conditions more disulfides will settle out from the treating solution. However, even in this case, the separation is not complete because the densities of disulfides and alkali metal hydroxide treating solution differ so slightly, i.e., about 0.9 for the disulfides and about 1.1 for the treating solution. Therefore, even under these conditions it is usually necessary to strip the remaining disulfides from the treating solution, and this is accomplished efficiently by use of the excess gas separated from the treating solution at the high pressure of the mixing zone.

The stripping operations are conducted at a temperature in excess of the temperature of the mixing zone; preferably this difference in temperature is at least 5° C., more especially about 10° C., and can sometimes advantageously be as great as 15° C. or 30° C. up to about 50° C. to about 70° C. The pressure of the stripping zone is preferably not greatly above atmospheric pressure, especially only sufficiently above atmospheric pressure to provide proper control of the various stream flow rates and other stripping process variables in accordance with conventional practices well known in the art. However, if desired, higher pressures can be used as long as the stripping zone pressure is maintained substantially lower than the pressure of the separation zone. In general, it is necessary that the difference between the stripping zone pressure and the separation zone pressure be at least 0.5 atm., especially at least 2 atm. Best results are generally obtained when the total pressure in the separation zone is about 6.0 atm. abs. and the total pressure in the stripping zone is about 1.5 atm. abs. With this pressure of 1.5 atm. abs. in the stripping zone, the pressure in the separation zone can be as high as 10 atm. or even 20 atm. with especially good results in the stripping operation, but as before mentioned such higher pressures are usually not economical because of the more expensive compressing equipment and energy required.

The invention is illustrated in the following examples.

*Example I*

Five cubic meters per hour of a sodium hydroxide solution to be regenerated, which contains mercaptides, are led via line 1, filter 2, line 3, heat exchanger 4 and line 5 into a propeller mixer or turbo-mixer 6. The solution to be regenerated had an initial temperature of 30° C., which was increased to 70° C. by the heat exchanger 4, and contained 5–10 gm. of mercaptan (mercaptide) sulfur per liter and 15–20% by weight of NaOH. 300–500 kg. of air are also dispersed per hour under a pressure of 6 atm. abs. in the solution in the mixer 6 via the line 7. The dispersion containing the mercaptides now converted into disulfides is drawn off from the top of the mixer 6 via line 8 and led into a separator 9 in which the air is separated from the solution. Via line 10 and pressure-reducing valve 11, the solution is introduced at a pressure of 1.5 atm. abs. via line 12 and steam heater 13 (temperature of the solution now becomes 80° C.) into the top of the stripping column 21. The air separated, which already contains an amount of disulfides, is led via line 14, pressure-reducing valve 15 and line 16 at a slight superatmospheric pressure with respect to the solution into the bottom of the stripping column 21. The air charged with the disulfides from the solution is drawn off via line 17 from the top of the stripping column 21.

If desired, the sulfides may be separated from the air and worked up into valuable chemical products.

The regenerated sodium hydroxide solution, which has a temperature of approximately 80° C. is drawn off from the bottom of the stripping column 21 via line 18, heat exchanger 4 and line 19 (the temperature of the solution drops to approximately 40° C.) and temporarily stored in storage tank 20.

Analysis shows that the regenerated solution has a very low mercaptan (mercaptide) sulfur content, viz. less than 0.2 gm. per liter.

*Example II*

A sodium hydroxide solution to be regenerated having a temperature of approximately 30° C. and containing mercaptides is continuously led via line 31, filter 32 and line 33 into a propeller or turbo-mixer 36. Air is dispersed in it via line 37 at a pressure of 6 atm. abs. A dispersion containing the mercaptides converted into disulfides is drawn off from the top of the mixer 36 and led via line 38 into separator 39. In this vessel, air containing a portion of the disulfides, is separated from the solution. The solution is led via line 40 from the bottom of the separator 39 into the bottom of a settler 70, in which settler a separation takes place into two liquid phases, disulfides (at the top and incompletely regenerated (i.e., still containing disulfides) sodium hydroxide solution at the bottom. The separated disulfides leave the settler via line 71, pressure-reducing valve 72 and line 79. The incompletely regenerated sodium hydroxide solution is led into stripping column 51 via line 73, pressure-reducing valve 74, line 75, heat exchanger 34, line 76, steam heater 77 and line 78. In this stripping column 51 the solution is freed from the remaining quantities of disulfides present in it by means of low-pressure air from the separator 39, via line 44, pressure-reducing valve 45 and line 46. The air charged with disulfides leaves the stripping column 51 via line 47. The now fully regenerated sodium hydroxide solution is drawn off from the bottom of the stripping column 51 via line 49 and heat exchanger 34, and temporarily stored in storage tank 50.

We claim as our invention:

1. In a continuous method of regenerating a spent aqueous alkaline treating solution containing an objectionable amount of alkali metal mercaptides, the combination of steps comprising (1) passing the spent solution in a stream to a first zone and there intimately mixing the spent solution with an excess of an oxygen-containing gas at a superatmospheric pressure in excess of at least 2.5 atmospheres absolute, dissolving and dispersing gas throughout the solution and thereby oxidizing substantially all of the mercaptides to organic disulfides; (2) passing the gas and treating solution mixture from the first zone to a second zone and there separating the excess of the gas at a still elevated pressure from the now disulfide-containing treating solution, along with some disulfides entrained in the gas; (3) removing the separated gas from the second zone and expanding it to a lower pressure in excess of atmospheric to increase its disulfide carrying capacity; (4) removing the disulfide-containing treating solution from the second zone and reducing the pressure thereon to a pressure less than that of the expanded gas; (5) introducing the expanded gas and treating solution under reduced pressure to a third zone and there employing the gas as a stripping medium to remove substantially all of the remaining disulfides, and thereby complete the regeneration of the treating solution.

2. A process as described in claim 1 wherein the oxygen-containing gas is air and the intimate mixing of step (1) is carried on at a temperature less than 80° C., and wherein the separated disulfide-containing treating solution from step (2) is raised to a temperature at least 5° higher than the temperature of the intimate mixing step (1) prior to stripping in step (5).

3. A process in accordance with claim 1 wherein a portion of the disulfides remaining in the solution after the separation step (2) is separated through settling before the solution is stripped in step (5) with the expanded gas.

References Cited in the file of this patent

UNITED STATES PATENTS

| | | |
|---|---|---|
| 2,080,654 | Craig | May 18, 1937 |
| 2,316,691 | Hewlett | Apr. 13, 1943 |

FOREIGN PATENTS

| | | |
|---|---|---|
| 1,108,544 | France | Jan. 13, 1956 |